(12) United States Patent
Jiang et al.

(10) Patent No.: US 9,529,126 B2
(45) Date of Patent: Dec. 27, 2016

(54) FRESNEL ZONE PLATE

(71) Applicant: Wisconsin Alumni Research Foundation, Madison, WI (US)

(72) Inventors: Hongrui Jiang, Madison, WI (US); Yen-Sheng Lu, Madison, WI (US); Hewei Liu, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 102 days.

(21) Appl. No.: 14/151,087

(22) Filed: Jan. 9, 2014

(65) Prior Publication Data
US 2015/0192712 A1 Jul. 9, 2015

(51) Int. Cl.
G02B 5/18 (2006.01)
G02B 27/42 (2006.01)

(52) U.S. Cl.
CPC ........... G02B 5/1828 (2013.01); G02B 5/1876 (2013.01); G02B 27/42 (2013.01); G02B 2005/1804 (2013.01)

(58) Field of Classification Search
CPC ......... G02B 27/42; G02B 5/18; G02B 5/1876; G02B 5/188
USPC .................. 359/558, 565, 573, 567, 569, 574–576,359/737, 741–743
See application file for complete search history.

(56) References Cited

U.S. PATENT DOCUMENTS

| | | | | |
|---|---|---|---|---|
| 6,162,590 A * | 12/2000 | Block | ................ | G02B 5/1857 430/315 |
| 7,554,739 B2 | 6/2009 | Yamazaki | | |
| 2006/0028728 A1 * | 2/2006 | Li | ................ | 359/573 |
| 2006/0279843 A1 * | 12/2006 | Kurt et al. | ................ | 359/558 |
| 2007/0091444 A1 | 4/2007 | Kim et al. | | |
| 2010/0186809 A1 * | 7/2010 | Samuelson et al. | .......... | 136/256 |
| 2010/0221866 A1 * | 9/2010 | Graham | ............ | H01L 31/03522 438/73 |
| 2012/0153250 A1 * | 6/2012 | Modawar | .......... | H01L 31/03522 257/9 |
| 2013/0012022 A1 * | 1/2013 | Hung | .................. | H01L 29/0669 438/680 |
| 2013/0099345 A1 * | 4/2013 | Black | ................ | H01L 21/28506 257/436 |
| 2014/0332068 A1 * | 11/2014 | Jura | ........................ | B82Y 30/00 136/256 |
| 2015/0160531 A1 * | 6/2015 | Tsakalakos | ............ | G02B 1/118 136/256 |
| 2015/0214261 A1 * | 7/2015 | Park | ...................... | G02B 5/287 359/891 |
| 2015/0380583 A1 * | 12/2015 | Black | ................ | H01L 21/30604 257/49 |

OTHER PUBLICATIONS

Tung et al., "A Novel Solid State Tunable Micro Lens", MEMS 2007, Kobe, Japan, Jan. 21-25, 2007, pp. 747-750.

* cited by examiner

*Primary Examiner* — Bumsuk Won
*Assistant Examiner* — Ephrem Mebrahtu
(74) *Attorney, Agent, or Firm* — Boyle Fredrickson, S.C.

(57) ABSTRACT

A Fresnel zone plate is provided for encountering incident light having a wavelength. The Fresnel zone plate has a focal length and a wafer including alternating transparent and opaque zones, and a mourning surface. A plurality of silicon nanowires extend into opaque zone of the wafer. A mechanically stretchable tuning structure is mounted to the mounting surface such that stretching of the tuning structure varies the focal length of the Fresnel zone plate.

15 Claims, 4 Drawing Sheets

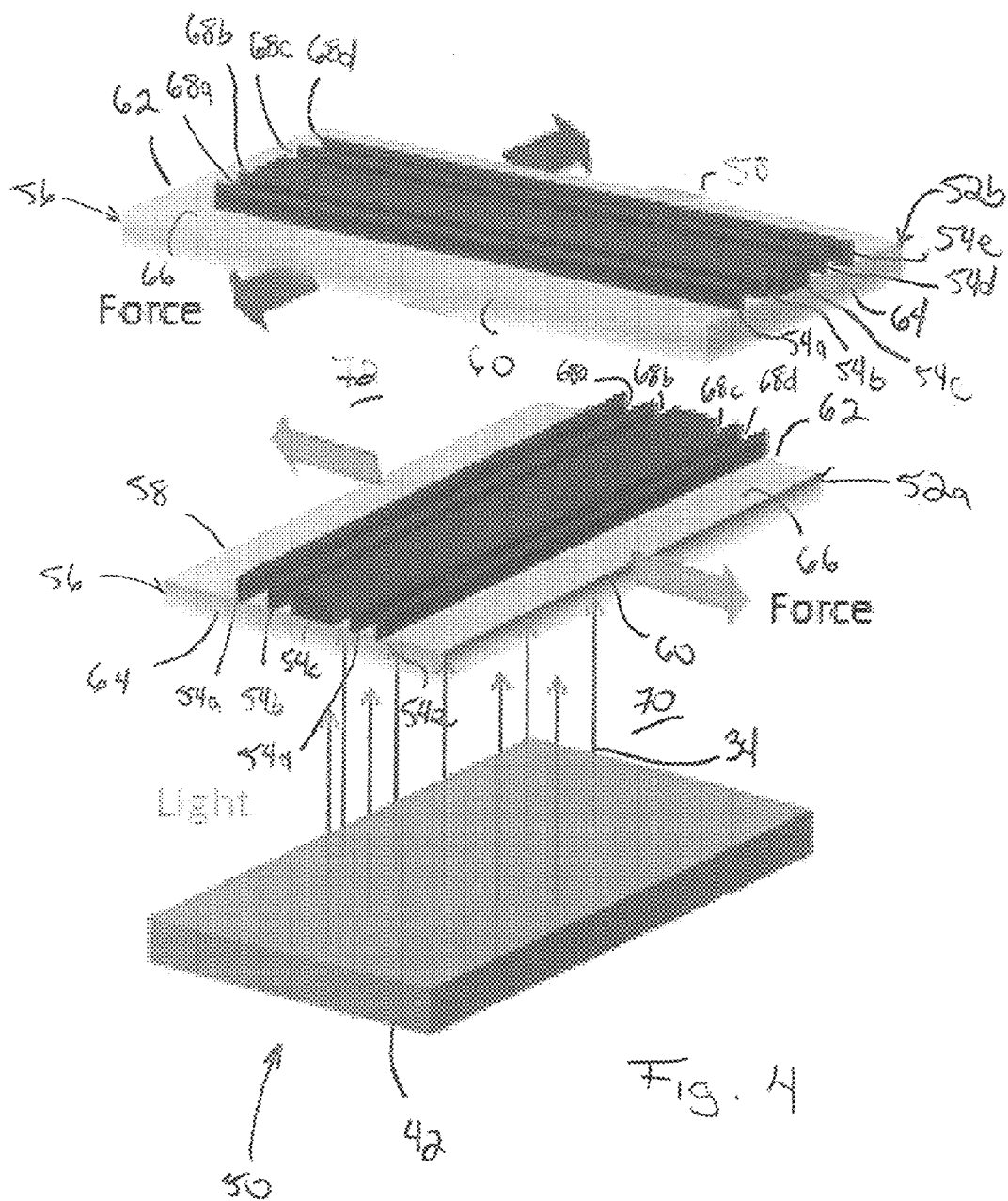

FRESNEL ZONE PLATE

REFERENCE TO GOVERNMENT GRANT

This invention was made with government support under OD008678 awarded by the National Institutes of Health. The government has certain rights in the invention.

FIELD OF THE INVENTION

This invention relates generally to microlenses, and in particular, to a Fresnel zone plate with an adjustable focal length which may be easily integrated with electronic circuits.

BACKGROUND OF THE INVENTION

A Fresnel lens or zone plate is a type of compact lens divided into a set of concentric annular sections. In each section, the overall thickness is decreased to effectively divide the continuous surface of a standard lens into a set of surfaces of the same curvature, with stepwise discontinuities between them. This arrangement allows for the construction of lenses without the mass and volumes of material that would be required by lenses of conventional design.

Fresnel zone plates with their flat surfaces and small volumes are attractive for focusing, collimating and bending light in miniaturized optical systems and integrated optics. Unlike curved lenses or mirrors, Fresnel zone plates typically use diffraction of the incident light instead of the refraction or reflection thereof. More specifically, a Fresnel zone plate includes a set of radially symmetric rings, known as Fresnel zones, which alternate between opaque and transparent. Incident light encountering the Fresnel zone plate will diffract around the opaque zones. The opaque zones are spaced such that the diffracted light constructively interferes at a desired focus spot, thereby creating an image. While functional for their intended purpose, conventional Fresnel zone plates do have certain problems associated therewith. For example, the focal length of a conventional Fresnel zone plate is fixed. It can be appreciated that modifying the convention Fresnel zone plate to have an adjustable focal length would be highly desirable.

Recently, a reflective Fresnel zone plate incorporating carbon nanotube forests was proposed. As is known, carbon nanotube forests exhibit near-perfect optical absorption due to low reflectance and nanoscale surface roughness. It is contemplated for the opaque Fresnel zones of the Fresnel zone plate to be defined by dark nanotube forests which effectively prevent light reflection from the opaque region. This arrangement allows for the Fresnel zone plate to exhibit a high contrast focusing of light as a result of the near-perfect optical absorption of the carbon nanotubes, thereby providing efficient focusing performance at optical wavelengths. As a result, the reflective Fresnel lens may be used for efficiently focusing and collimating light in optical data transfer and communication systems. In addition, two-dimensional source arrays for neural network architectures can be realized using reflective Fresnel lens arrays. However, given that fabrication of the carbon nanotube forests on prior, reflective Fresnel zone plates requires chemical vapor deposition of the carbon at extremely, high temperatures, e.g. 540° C., integration of the reflective Fresnel zone plates with silicon-based electronic circuits is difficult.

Therefore, it is a primary object and feature of the present invention to provide a Fresnel zone plate having an adjustable focal length.

It is a further object and feature of the present invention to provide a Fresnel zone plate which is simple and inexpensive to manufacture.

It is a still further object and feature of the present invention is to provide a Fresnel zone plate which may be simply and easily integrated with electronic circuits.

In accordance with the present invention, a Fresnel zone plate is provided for encountering incident light having a wavelength. The Fresnel zone plate includes a first set of rings radially spaced about a central axis. The first set of rings is transparent. A second set of rings is also radially spaced about the central axis. Each ring of the second set of rings includes a surface lying in a plane perpendicular to the central axis and is opaque. A plurality of silicon nanowires extend into at least one of the surfaces of the second set of rings.

Each of the plurality of silicon nanowires is spaced from an adjacent one of the plurality of silicon nanowires by a distance. The distance is less than the wavelength of the incident light. A mounting surface is spaced from and generally parallel to the surfaces of the second set of rings and a tuning structure is mounted to the mounting surface. The tuning structure includes a plate wherein mechanically stretching of the plate adjusts a focal length of the Fresnel zone plate. The plate is fabricated from an elastomer and is transparent. The plurality of silicon nanowires have lengths. The lengths of the plurality of silicon nanowires are in the range of 1 micrometer to 6 micrometers.

In accordance with a further aspect of the present invention, a Fresnel zone plate is provided for encountering incident light having a wavelength. The Fresnel zone plate has a focal length and includes a wafer having alternating transparent and opaque zones, and a mounting surface. A tuning structure mounted to the mounting surface such that actuation of the tuning structure adjusts the focal length.

The mounting surface is on a first side of the wafer and the second side of the wafer includes first and second sets of rings. The first set of rings is radially spaced about a central axis. The first set of rings is transparent. The second set of rings is radially spaced about the central axis. Each ring of the second set of rings includes a surface lying in a plane perpendicular to the central axis and is opaque. A plurality of silicon nanowires extend into at least one of the surfaces of the second set of rings. Each of the plurality of silicon nanowires is spaced from an adjacent one of the plurality of silicon nanowires by a distance. The distance is less than the wavelength of the incident light. The plurality of silicon nanowires have lengths. The lengths of the plurality of silicon nanowires are in the range of 1 micrometer to 6 micrometers. The tuning structure is actuated by mechanical stretching and includes a plate. The plate is fabricated from an elastomer and is transparent.

In accordance with a still further aspect of the present invention, a Fresnel zone plate is provided for encountering incident light having a wavelength. The Fresnel zone plate has a focal length and a wafer including alternating transparent and opaque zones, and a mounting surface. A plurality of silicon nanowires extend into opaque zone of the wafer. A mechanically stretchable tuning structure is mounted to the mounting surface such that stretching of the tuning structure, varies the focal length of the Fresnel zone plate.

The mounting surface is on a first side of the wafer and the second side of the wafer includes first and second sets of rings. The first set of rings is radially spaced about a central axis. The first set of rings is transparent. The second set of rings is radially spaced about the central axis. Each ring of the second set of rings includes a surface lying in a plane perpendicular to the central axis and is opaque. Each of the plurality of silicon nanowires is spaced from an adjacent one of the plurality of silicon nanowires by a distance. The distance is less than the wavelength of the incident light. The plurality of silicon nanowires have lengths. The lengths of the plurality of silicon nanowires are in the range of 1 micrometer to 6 micrometers. The tuning structure includes a plate that is fabricated from an elastomer and is transparent.

BRIEF DESCRIPTION OF THE DRAWINGS

The drawings furnished herewith illustrate a preferred construction of the present invention in which the above aspects, advantages and features are clearly disclosed as is well as others which will be readily understood from the following description of the illustrated embodiments.

In the drawings:

FIG. 4 is a schematic, isometric view of an alternate embodiment of the present invention including first and second Fresnel zone plates.

DETAILED DESCRIPTION OF THE DRAWINGS

Figure 1A:
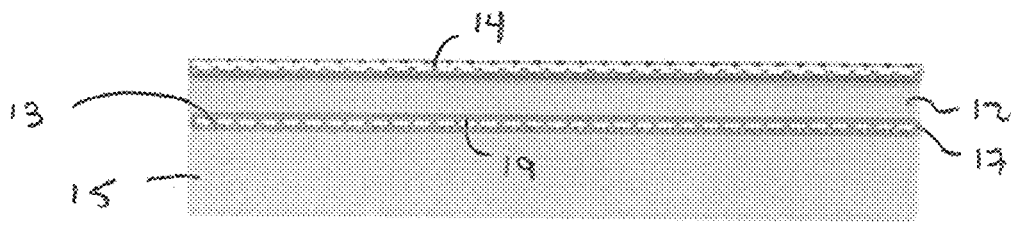
FIG. 1a is a schematic view of a first step in the fabrication of a Fresnel zone plate in accordance with the present invention.
Figure 1B:
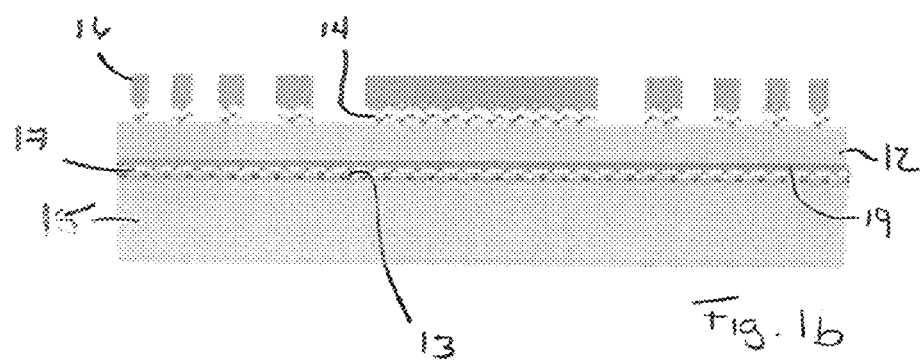
FIG. 1b is a schematic view of a second step in the fabrication of a Fresnel zone plate in accordance with the present invention.
Figure 1C:
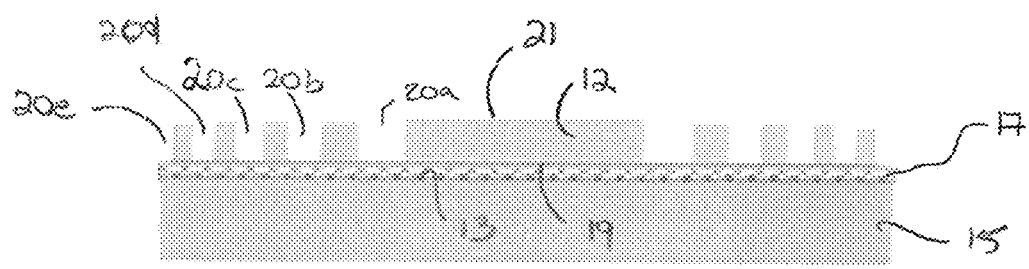
FIG. 1c is a schematic view of a third step in the fabrication of a Fresnel zone plate in accordance with the present invention.
Figure 1D:
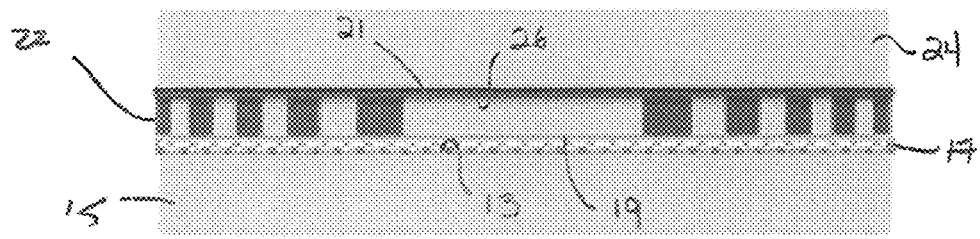
FIG. 1d is a schematic view of a fourth step in the fabrication of a Fresnel zone plate in accordance with the present invention.
Figure 1E:
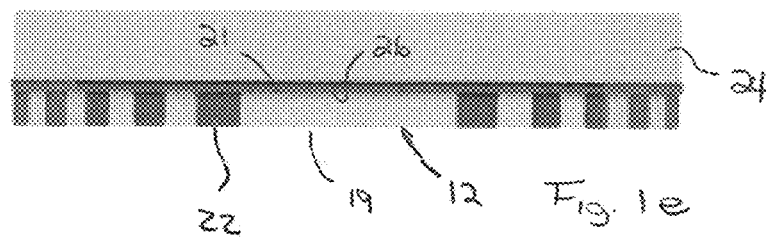
FIG. 1e is a schematic view of a fifth step in the fabrication of a Fresnel zone plate in accordance with the present invention.
Figure 1F:
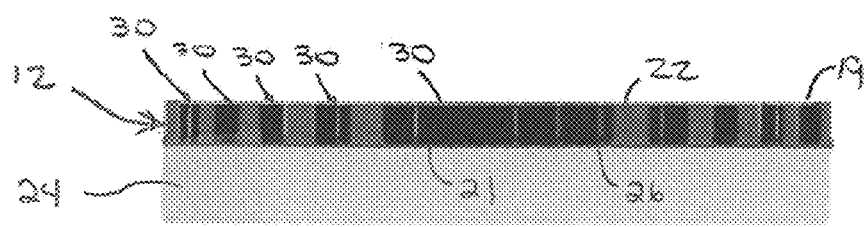
FIG. 1f is a schematic view of a sixth step in the fabrication of a Fresnel zone plate in accordance with the present invention.
Figure 1G:
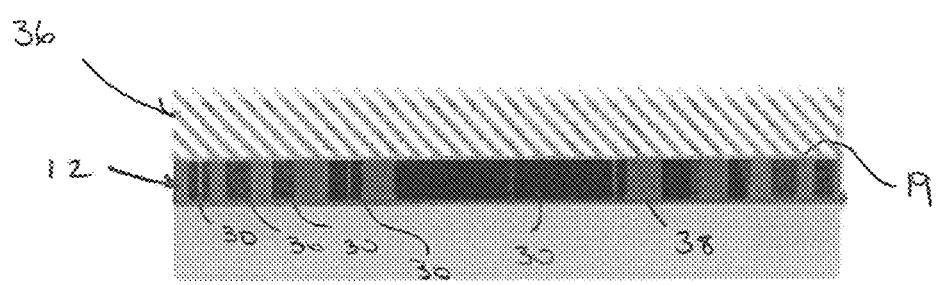
FIG. 1g is a schematic view of a seventh step in the fabrication of a Fresnel zone plate in accordance with the present invention.
Figure 1H:
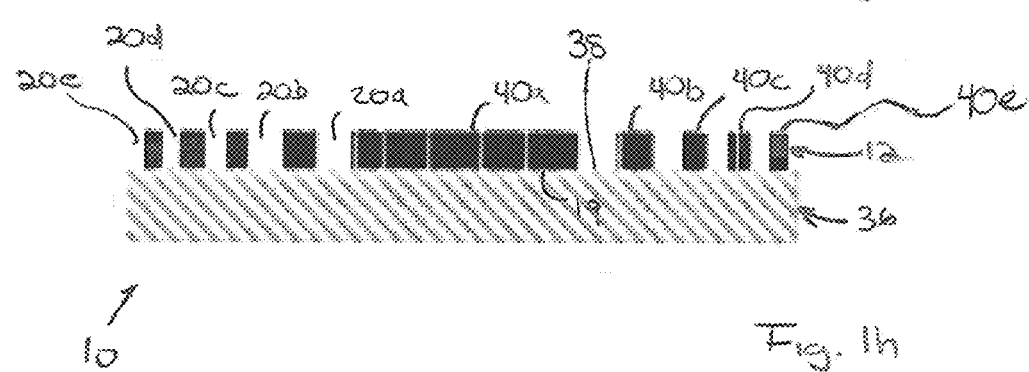
FIG. 1h is a schematic view of an eighth step in the fabrication of a Fresnel zone plate in accordance with the present invention.
Figure 2:
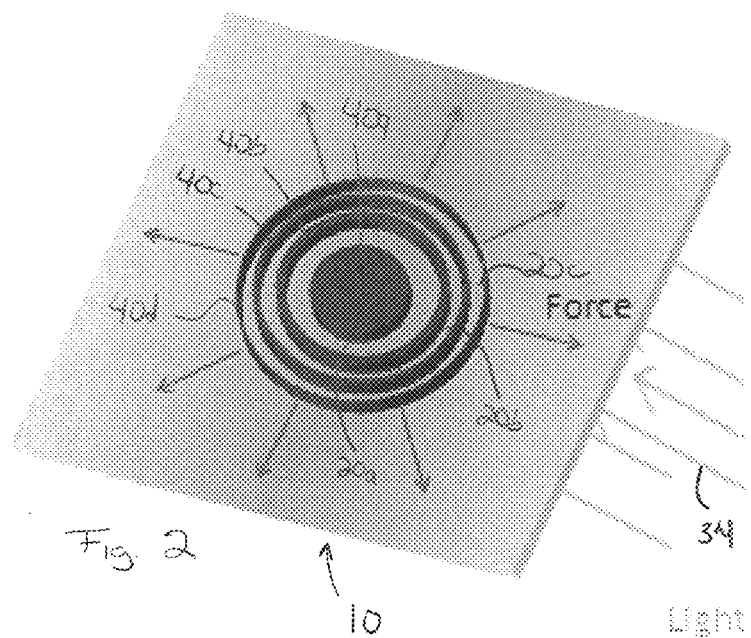
FIG. 2 is a schematic, isometric view of a Fresnel zone plate in accordance with the present invention.

Referring to FIG. 2, a reflective Fresnel lens or zone plate is generally designated by the reference numeral 10. As is known, a Fresnel zone plate includes alternating opaque and transparent zones which renders a focused light spot by the constructive interference of light reflected from the transparent zones. FIGS. 1a-1h schematically depicts the methodology for fabricating zone plate 10 in accordance with the present invention. More specifically, referring to FIG. 1a, device layer 12 is provided. Device layer 12 may take the form of a silicon on insulator (SOI) wafer (N-type) with a resistivity of 1-10 ohm-cm or a p-type silicon wafer with a resistivity of 1-100 ohm-cm. However, other types of layers may be used without deviating from the scope of the present invention. It is contemplated from device layer 12 to have a thickness in range of 1 micrometer to 6 micrometers, and preferably, in the range of 2 micrometers to 5 micrometers. Device layer 12 is supported on upper surface 13 of first silicon substrate 15. A layer 17 of silicon oxide is provided between upper surface 13 of first silicon substrate 15 and first side 19 of device layer 12. Device layer 12 further includes thermally grown layer 14 of silicon oxide, e.g. 150 nm-thick, on a second side 21 thereof.

Referring to FIG. 1b, photoresist 16 is spun on layer 14 at a predetermined speed (e.g. 2500 rpm) for a predetermined time period (e.g. 30 seconds). Thereafter, device layer 12 is soft baked at a predetermined temperature (e.g. 115° C.) for predetermined time period (e.g. 1 minute). The exposure time of the photoresist 16 is set to a predetermined time period (e.g. 9.5 seconds) with a selected dose of electromagnetic radiation (e.g. 10 mW/cm2). It is further contemplated to exposed photoresist 16 to a selected developer for a predetermined time period (e.g. 1 minute). With photoresist 16 received on layer 14, photoresist 16 is lithographically patterned with the concentric circle geometry of a conventional Fresnel zone plate and layer 14 is etched in a conventional manner, such as by buffered oxide etching, for a predetermined, time period (e.g. 2 minutes).

Inductively Coupled Plasma is utilized for deep reactive ion etching of device layer 12 so as to anisotropically etch the concentric circles 20a-20e of a conventional Fresnel zone plate into device layer 12. FIG. 1c. Thereafter, transfer layer 22 is provided in concentric circles 20a-20e of device layer 12 to protect device layer 12 during the etching of silicon nanowires therein, as hereinafter described. First surface 26 of second silicon substrate 24 is positioned adjacent second side 21 of device layer 12 so as to retain transfer layer 22 in concentric circles 20a-20e, FIG. 1d. First silicon substrate 15 is removed from layer 17 by deep reactive ion etching and layer 17 is removed from device layer 12 by immersing layer 17 in a buffer oxide etching material for a predetermined period of time e.g. 15 minutes, FIG. 1e.

In order to form the opaque zones of Fresnel zone plate 10, it is contemplated to etch silicon nanowires 30 into first side 19 of device layer 12. The etching process of silicon nanowires into first side 19 of device layer 12 includes the steps of both silver (Ag) nanoparticle deposition and electroless chemical etching. More specifically, as is known, silver nitrate (AgNO3) is the chemical precursor for Ag nanoparticles in the chemical etchant wherein hydrogen reduces Ag+ to Ag nanoparticles on a silicon (Si) surface. The chemical reaction can be expressed as:

$$H_2O_2 + 2Ag^+ \rightarrow O_2 + 2H^+ + 2Ag \qquad \text{Expression (1)}$$

The electroless etching mechanism can be summarized by two half-cell reactions in a galvanic cell to explain the etching behavior at the contact interface of Ag nanoparticles and device layer 12. More specifically, the cathode reaction that occurs at the Ag nanoparticle site can be expressed as:

$$H_2O_2 + 2H^+ + 2e^- \rightarrow 2H_2O \qquad \text{Expression (2)}$$

Further, the anode reaction that occurs at device layer 12 can be expressed as:

$$Si + 2H_2O \rightarrow SiO_2 + 4H^+ + 4e^- \qquad \text{Expression (3)}$$

$$SiO_2 + 6HF \rightarrow H_2SiF_6 + 2H_2O \qquad \text{Expression (4)}$$

Hence, the overall reaction can be expressed as:

$$Si + 2H_2O_2 + 6HF \rightarrow H_2SiF_6 + 4H_2O \qquad \text{Expression (5)}$$

As a result, the galvanic cell is established because the electrical potential of Ag nanoparticles is higher than the Fermi level of device layer 12. In operation, Ag nanoparticles deposited on first side 19 of device layer 12, acting as the cathode, accumulate the electrons generated from the oxidation of the surrounding Si of device layer 12. The newly formed oxide is immediately attacked and removed away by HF. The Ag nanoparticles sink into the pits generated in first side 19 of device layer 12. A continuous etching process will make the pits (silicon nanowires 30) deeper. After removing the Ag nanoparticles from device layer 12 using $HNO_3$ and $H_2O_2$, the vertically aligned silicon nanowires 30 are obtained in first side 19 of device layer 12, FIG. 1f Preferably, silicon nanowires 30 are etched through entirety of device layer 12, thereby have a length in the range of 1 micrometer to 6 micrometers, and preferably, in the range of 2 micrometers to 5 micrometers.

It can be appreciated that the silicon nanowire etching process is dependent on the concentration of $AgNO_3$, $H_2O_2$ and HF used. For example, the concentration of $AgNO_3$ influences the Ag particle size and the density of particles formed on the silicon surface. However, it is intended for the randomly distributed silicon nanowires 30 in first side 19 of device layer 12 to have a spacing of less than the wavelength (subwavelength structure) of incident light 34. FIGS. 2-4, and to have lower light reflection properties as compared to well-ordered silicon nanowires. The cone-like silicon nanowires 30 fabricated as heretofore described, encourage incident light 34 to scatter randomly inside thereof so as to elongate the travel path of the incident light, thereby leading to low reflection.

After silicon nanowires 30 are etched into first side 19 of device layer 12, a thin, transparent and flexible tuning structure, generally designated by the reference number 36, is adhered to device layer 12, FIG. 1g. More specifically, it is contemplated to adhere first side 38 of tuning structure 36 to first side 19 of device layer 12. Preferably, tuning structure is fabricated from a transparent elastomer, such as polydimethylsiloxane (PDMS). Therefore, transfer layer 22 is heated to it's the melting temperature and removed by concentric circles 20a-20. FIG. 1h, thereby providing Fresnel zone plate 10 in accordance with the present invention, FIG. 2.

As heretofore described, zone plate 10 includes alternating opaque and transparent zones which renders a focused light spot by the constructive interference of light reflected from the transparent zones. The opaque zones of zone plate 10 are defined by a series of concentric rings (e.g. rings 40a-40e, in FIGS. 1h, 3a and 3b). Concentric rings 40a-40e corresponding to the portions of device layer 12 wherein silicon nanowires 30 are etched, as heretofore described. The transparent zones of zone plate 10 are defined by concentric circles 20a-20e formed in zone plate 10. The transparency of tuning structure 36 allows defracted incident light to pass through concentric circles 20a-20e of device layer 12.

Figures 3A, 3B:
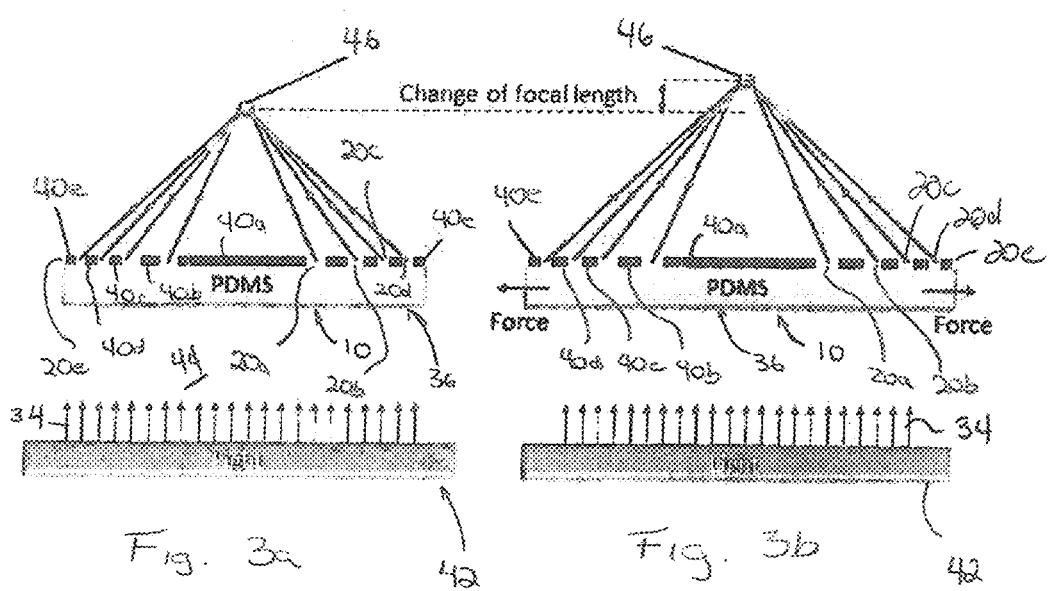
FIG. 3a is a schematic, side elevational view of the Fresnel zone plate of FIG. 2 in a first configuration having a first focal length.
FIG. 3b is a schematic, side elevational view of the Fresnel zone plate of FIG. 2 in a second configuration having a second focal length.

Referring to FIG. 3a, in operation, zone plate 10 is aligned with source 42 of incident light 34 positioned on a first side 44 of zone plate 10. Incident light 34 passes through tuning structure 36 and defracts around the opaque zones, namely, rings 40a-40e. Rings 40a-40e are spaced so that the diffracted incident light constructively interferes at a focused light spot 46 so as to create an image there. In order to change the focal length of zone plate 10, it is contemplated to mechanically stretch tuning structure 36 with an external force such that the radii of the alternating opaque and transparent zones (rings 40a-40e and concentric circles 20a-20e, respectively) increases. By increasing the radii of the alternating opaque and transparent zones, the focal length of zone plate 10 is increased. FIG. 3b.

Referring to FIG. 4, an alternate embodiment of a zone plate assembly in accordance with the present invention is generally designated by the reference numeral 50. Zone plate assembly 50 includes first and second zone plates 52a and 52b, respectively. First and second zone plates 52a and 52b, respectively, are identical in structure such that the description hereinafter of zone plate 52a is understood to describe zone plate 52b as if fully described herein.

Zone plate 52a includes alternating opaque and transparent zones which render a focused light pattern along a line by the constructive interference of light reflected from the transparent zones. Zone plate 52a includes a thin, transparent and flexible tuning structure, generally designated by the reference number 56. Tuning structure 56 extends along an axis and includes first and second sides 58 and 60, respectively; first and second ends 62 and 64, respectively; and an upper surface 66. Preferably, tuning structure is fabricated from a transparent elastomer, such as polydimethylsiloxane (PDMS). The opaque zones of zone plate 52a are formed from a silicon wafer, as heretofore described with respect to zone plate 10, and are defined by a series of generally spaced, parallel lines (e.g. lines 54a-54e) extending from first end 62 of tuning structure 56 to second end 64 of tuning structure 56 along upper surface 66 thereof. Lines 54a-54e corresponding to the portions of the silicon wafer wherein silicon nanowires 30 are etched, as heretofore described. The transparent zones of zone plate 52a are defined by a series of generally spaced, channels (e.g. channels 68a-68d) extending from first end 62 of tuning structure 56 to second end 64 of tuning structure 56 between adjacent lines 54a-54e, as depicted in FIG. 4.

In operation, first zone plate 52a is aligned with source 42 of incident light 34 positioned on a first side 70 thereof. Second zone plate 52b is aligned with source 42 of incident light 34 and positioned on a second side 72 of first zone plate 52a such that the axis of tuning structure 56 of second zone plate 52b is perpendicular to the axis of tuning structure 56 of first zone plate 52a. It can be appreciated that incident light 34 passes through tuning structure 56 of first zone plate 52a and defracts around the opaque zones, namely, lines 54a-54e. Lines 54a-54e are spaced so that the diffracted incident light constructively interferes along a line on second side 72 of first zone plate 52a. The diffracted incident light passes through tuning structure 56 of second zone plate 52b and defracts around the opaque zones, namely, lines 54a-54e of second zone plate 52b. Lines 54a-54e of second zone plate 52b are spaced so that the diffracted incident light constructively interferes at a focused light spot so as to create an image there.

In order to change the focal length of first and second zone plates 52a and 52b, respectively, it is contemplated to mechanically stretch tuning structures 56 of first and to second zone plates 52a and 52b, respectively, with an external force in a direction perpendicular to lines 54a-54e such that the widths the alternating opaque and transparent zones (lines 54a-54e and channels 68a-68e, respectively) increase. By increasing the widths of the alternating opaque and transparent zones, the focal lengths of first and second zone plates 52a and 52b, respectively, are increased.

Various modes of carrying out the invention are contemplated as being within the scope of the following claims particularly pointing out and distinctly claiming the subject matter, which is regarded as the invention.

We claim:

1. A Fresnel zone plate for encountering incident light having a wavelength, comprising:
   a substrate defining a generally planar surface;
   a first set of rings radially spaced about a central axis along the surface of the substrate, the first set of rings being transparent;
   a second set of rings radially spaced about the central axis along the surface of the substrate, each ring of the second set of rings including a surface lying in a plane perpendicular to the central axis and being opaque; and
   a plurality of silicon nanowires extending into at least one of the surfaces of the second set of rings, the plurality of silicon nanowires;
      having lengths in the range of 1 micrometer to 6 micrometers; and
      being randomly distributed in the at least one of the surfaces of the second set of rings;
   wherein each of the plurality of silicon nanowires extending along a corresponding axis generally perpendicular to the plane and being spaced from an adjacent silicon nanowire by a distance less than the wavelength of the incident light.

2. The Fresnel zone plate of claim 1 wherein at least one ring of the first and second sets of rings includes a mounting surface spaced from and generally parallel to the surfaces of the second set of rings and wherein the substrate includes a tuning structure mounted to the mounting surface.

3. The Fresnel zone plate of claim 2 wherein the tuning structure includes a plate wherein mechanically stretching of the plate adjusts a focal length of the Fresnel zone plate.

4. The Fresnel zone plate of claim 3 wherein the plate is fabricated from an elastomer.

5. The Fresnel zone plate of claim 3 wherein the plate is transparent.

6. A Fresnel zone plate for encountering incident light having a wavelength, the Fresnel zone plate having a focal length, comprising:
   a wafer including first and second sides and alternating transparent and opaque zones, the second side of the wafer including:
      a first set of rings radially spaced about a central axis, the first set of rings being transparent; and
      a second set of rings radially spaced about the central axis, each ring of the second set of rings including a surface lying in a plane perpendicular to the central axis and being opaque;
   a plurality of silicon nanowires extending into at least one of the surfaces of the second set of rings, the plurality of silicon nanowires being randomly distributed in the at least one of the surfaces of the second set of rings and each of the plurality of silicon nanowires:
      extending along a corresponding axis generally perpendicular to the plane;
      having lengths in the range of 1 micrometer to 6 micrometers; and
      being spaced from an adjacent silicon nanowire by a distance less than the wavelength of the incident light; and
   a tuning structure mounted to the first side of the wafer;
   wherein actuation of the tuning structure adjusts the focal length.

7. The Fresnel zone plate of claim 6 wherein the tuning structure is actuated by mechanical stretching.

8. The Fresnel zone plate of claim 6 wherein the tuning structure includes a plate.

9. The Fresnel zone plate of claim 8 wherein the plate is fabricated from an elastomer.

10. The Fresnel zone plate of claim 8 wherein the plate is transparent.

11. A Fresnel zone plate for encountering incident light having a wavelength, the Fresnel zone plate having a focal length, comprising:
   a wafer including alternating transparent and opaque zones, and a mounting surface, the opaque zone including an outer surface lying in a first plane generally parallel to the mounting surface;
   a plurality of silicon nanowires extending into the outer surface of the opaque zone of the wafer along corresponding axes which are generally perpendicular to the outer surface, the plurality of silicon nanowires being randomly distributed in the opaque zone and spaced from an adjacent silicon nanowire by a distance less than the wavelength of the incident light; and
   a mechanically stretchable tuning structure mounted to the mounting surface;
   wherein stretching of the tuning structure varies the focal length of the Fresnel zone plate.

12. The Fresnel zone plate of claim 11 wherein the mounting surface is on a first side of the wafer and wherein the second side of the wafer includes:
   a first set of rings radially spaced about a central axis, the first set of rings being transparent; and
   a second set of rings radially spaced about the central axis, each ring of the second set of rings including the outer surface which is perpendicular to the central axis.

13. The Fresnel zone plate of claim 11 wherein the plurality of silicon nanowires have lengths, the lengths of the plurality of silicon nanowires are in the range of 1 micrometer to 6 micrometers.

14. The Fresnel zone plate of claim 11 wherein the tuning structure includes a plate, the plate being fabricated from an elastomer.

15. The Fresnel zone plate of claim 11 wherein the tuning structure includes a plate, the plate being transparent.

* * * * *